Patented Feb. 10, 1925.

1,526,072

UNITED STATES PATENT OFFICE.

OTTO LOWY, OF NEWARK, NEW JERSEY, ASSIGNOR, BY MESNE ASSIGNMENTS, TO TECHNICAL PRODUCTS CORPORATION, A CORPORATION OF NEW JERSEY.

ARSENICAL PREPARATION AND METHOD OF PRODUCING THE SAME.

No Drawing.     Application filed October 4, 1919.  Serial No. 328,485.

*To all whom it may concern:*

Be it known that I, OTTO LOWY, a citizen of the United States, and a resident of the city of Newark, county of Essex, and State of New Jersey, have invented an Improvement in Arsenical Preparations and Methods of Producing the Same, of which the following is a specification.

The present invention relates to a method of preparing solutions of medicinal, arsenical compounds, particularly derivatives of arseno-benzol, such as the dihydrochloride of diaminodioxyarsenobenzol (called arsphenamine or salvarsan). The present invention comprises, also, the resulting products in the form of stable, aqueous solutions.

The invention aims to prepare solutions of the foregoing compounds which shall be more stable and less liable to decomposition and oxidation than the solid compounds and solutions of the same hitherto in use. The solutions prepared in accordance with the present invention are also less liable to become toxic on being kept for considerable periods of time and may, therefore, conveniently and safely be put up in solution form for storage, distribution and application. Such solutions may also be very economically and far more expeditiously, conveniently, and safely administered by physicians of only moderate skill than the arsenical compounds and solutions hitherto employed.

The arsenical compounds referred to above are, as is well known, used in the cure of certain venereal diseases by injecting solutions of the same into the patient being treated. To this end the dry powder, which is the form in which such compounds are at present sold, is, according to the practice hitherto employed, mixed with distilled water and whatever other ingredients the administering physician may deem necessary or advisable. In this form the solution of the arsenical compound must be immediately injected into the patient, since it otherwise will soon become wholly unfit and dangerous to use. This is due to the fact that solutions so prepared rapidly decompose and become very toxic.

The arsenical solutions hitherto prepared possess the further disadvantages of uncertainty in mixing, variation in strength, and risks and dangers to the patient resulting from impure materials used in preparing the solutions or from careless handling, all as well known to the medical profession. Furthermore, the methods until now employed for preparing such solutions render the same expensive and uncertain in their action. Such methods, furthermore, require the skill of a specially trained physician, which fact adds further to the cost of preparing and administering the arsenical compounds.

These and other disadvantages are substantially avoided by the methods and products of the present invention. By way of example I shall describe herein an illustrative embodiment of the method and of the product of my invention, it being understood that the specific forms of the method and of the product here described are set forth merely for purposes of illustration and that the invention is not to be limited to such specific, illustrative forms.

I first provide a quantity of sterile, distilled water, preferably in a suitable, open receptacle. Where so desired, I may add to this water .5 mgm. of mercuric chloride per gm. of arseno-benzol compound, or other substance or substances which it may be desired to administer along with the arsenical compound. The receptacle containing the sterile, distilled water is now placed under a glass bell jar which may be attached to a vacuum pump or is by other suitable means evacuated until the water is substantially freed from gas, particularly oxygen and carbon dioxide.

While solutions of various strengths and in any desired amounts may be prepared, I may proceed as follows in the preparation of about 50 c. c. of a 2% solution of arsphenamine containing 1 gm. of arsphenamine. To about 38.8 c. c. of the water thus prepared there is added, without the application of heat, about 1 gm. of the arseno-benzol compound, such as arsphenamine,

for example. If the addition of the arsphenamine to the evacuated water takes place without breaking the vacuum, as by means of mechanical devices under the glass bell jar, the resulting aqueous solution containing the arsphenamine will be further evacuated continuously so as to become or remain substantially gas-free. If, however, the vacuum is broken to permit the addition of the arsphenamine, the vacuum is reestablished and the aqueous solution of arsphenamine is then evacuated so as to become substantially gas-free. Preferably after the addition of the arsphenamine and before the solution is further evacuated, if the vacuum has been broken during the addition of the arsphenamine, the acidity of the solution is determined. It may here be stated that vigorous shaking is to be avoided at the various stages of the process where solution of an added substance is sought to be effected and where such shaking takes place in an oxidizing atmosphere.

There is now added to the aqueous solution of arsphenamine prepared as above, and with or without breaking the vacuum, an amount of alkali, such as sodium, hydroxide equal to from about 4⅓ to about 8, preferably 5, gram-molecules of hydroxide, per gram-molecule of arsphenamine. This amount of hydroxide corresponds to an excess of from about ⅓ to about 4, preferably 1, gram-molecule of hydroxide per gram-molecule of arsphenamine over what would be required to simply convert the arsphenamine into its di-sodium salt (di-sodium diaminodioxyarsenobenzol).

For thus purpose, I may add to the solution containing about 1 gm. of arsphenamine from about 9.12 to about 16.84 c. c. of a normal solution of sodium hydroxide, corresponding to from about 4⅓ to about 8 gram-molecules of hydroxide per gram-molecule of arsphenamine, but preferably I add about 10.53 c. c. of said normal solution corresponding to 5 gram-molecules of hydroxide per gram-molecule of arsphenamine. Preferably the normal solution of hydroxide is prepared by using sterile, distilled, gas-free, or evacuated water.

Enough of the alkali hydroxide, such as sodium hydrate or its equivalent is added to serve to minimize decomposition and toxicity, but not enough to cause any undesirable physiological reaction due to hemolysis. In the illustrative example here given the addition of the sodium hydroxide in the amounts specified is found to unexpectedly and in a very efficient and successful manner reduce and minimize decomposition of the arsenical solution and also its toxicity, even in cases where the solutions are kept for considerable periods of time, while yet substantially preventing all danger of excessive hemolysis on injecting the solution into the patient.

Where the vacuum has not been broken during the addition of the hydroxide or its equivalent, the solution soon becomes evacuated by the continued action of the evacuating means and is rendered or maintained substantially gas-free. On the other hand, if the vacuum has been broken during the addition of the hydroxide or its equivalent, the vacuum is reestablished and acts to free the alkaline solution of arsphenamine from any gaseous constituents that may be present. If desired, the solution may now be filtered, either with or without breaking the vacuum, the solution being further evacuated and again rendered substantially gas-free if the vacuum has been broken.

The substantially gas-free alkaline solution of arsphenamine is now ready to be packaged, as by sealing the same, preferably without access of air, oxygen or other oxidizing gas. This may be done by placing approximately 30 c. c. of the foregoing substantially gas-free, alkaline solution of arsphenamine corresponding to .6 gm. of arsphenamine in a 2% solution, in a sterilized ampule which is hermetically sealed so as to maintain the solution out of contact with an oxidizing gas, such as the air, preferably by sealing the ampule under a vacuum or in an inert gas, such as pure nitrogen. In this form, the ampule will efficiently maintain the solution in its substantially gas-free condition.

The resulting solution will be substantially gas-free, and of a degree of alkalinity which will reduce and minimize toxicity and decomposition, while avoiding danger of hemolysis. While the action of the excess of hydroxide is little understood, and while the applicant does not wish to limit himself to any particular theory of this action, it is probable that such excess of hydroxide either assists in retarding the chemical changes which ordinarily cause solutions of arsenical compounds, as hitherto prepared, to rapidly decompose and become toxic so as to soon become wholly unfit for use, or else that a new compound, more stable than arsphenamine itself or than the usual aqueous solutions of the alkali salts, as the di-sodium salt, of arsphenamine, is formed.

It is to be noted that the process to which the arsenical compound has been subjected in getting it into final solution form does not produce any harmful physiological or therapeutical changes in such compound, but, on the contrary, renders the final product surprisingly stable and free from harmful changes, particularly decomposition and toxicity. The final solution is of a yellow color, varying from light to dark shades of yellow.

The final solution is considerably less toxic than the solid compounds and solutions of the same hitherto in use. The physician may, therefore, use such solutions with considerable certainty and in larger doses than heretofore deemed advisable. Not only are these solutions more stable than the solutions of arsenical compounds as hitherto prepared, but even after the usual optical evidence of a change in color from light yellow to deeper shades of yellow, and even to orange and red, indicating increased toxicity, my solution is found to be much less toxic than the solutions formerly in use giving the same visible evidences of toxicity. Further evidence of the more stable character of my solution is given by the fact that the color changes in my solution are much less rapid than in the case of the solutions as hitherto prepared. Due also to the stable character of my solution, I may heat the same to body temperature so that it may be injected with little or no shock to the patient.

My process also results in a product which is substantially free from ether, methyl alcohol, oxygen, carbon dioxide, nitrogen, ammonia and other gases and the usual contaminating substances which accelerate oxidation and decomposition. By reason of its constitution, also, my solution is found not to be deleteriously affected by the carbon dioxide present in the blood stream of the patient into whom the injection has been made.

For the purpose of giving some indication of the low degree of toxicity of my solution it may be stated that the results obtained in a considerable series of tests with standard test animals showed no fatalities whatsoever, even after the solution had been boiled for a considerable length of time, whereas solutions prepared according to the methods hitherto employed, under like conditions always result in fatalities.

It is, of course, to be understood that my invention is not limited to the illustrative embodiments thereof here described for purposes of illustration only.

The present application is a continuation in part of my copending application, Serial No. 294,465, filed May 3, 1919, for "Processes for liquidifying arsenical compounds".

What I claim is:

1. A product comprising a stable aqueous, alkaline solution of an arseno-benzol derivative of a degree of alkalinity corresponding to from about ⅓ to about 4 gram-molecules of alkali hydroxide per gram-molecule of said arseno-benzol derivative.

2. A product comprising a stable aqueous, alkaline solution of an arseno-benzol derivative of a degree of alkalinity corresponding to about 1 gram-molecule of alkali hydroxide per gram-molécule of said arseno-benzol derivative.

3. A product comprising a substantially gas-free, aqueous, alkaline solution of an arseno-benzol derivative of a degree of alkalinity corresponding to from about ⅓ to about 4 gram-molecules of alkali hydroxide per gram-molecule of said arseno-benzol derivative.

4. A product comprising a substantially gas-free, aqueous, alkaline solution of an arseno-benzol derivative of a degree of alkalinity corresponding to about 1 gram-molecule of alkali hydroxide per gram-molecule of said arseno-benzol derivative.

5. A product comprising a substantially gas-free, aqueous solution of di-sodium diaminodioxyarsenobenzol of a degree of alkalinity corresponding to from about ⅓ to about 4 gram-molecules of sodium hydroxide per gram-molecule of di-sodium diaminodioxyarsenobenzol.

6. A product comprising a substantially gas-free, aqueous solution of di-sodium diaminodioxyarsenobenzol of a degree of alkalinity corresponding to about 1 gram-molecule of sodium hydroxide per gram-molecule of di-sodium diaminodioxyarsenobenzol.

7. A product comprising a stable aqueous solution of di-sodium diaminodioxyarsenobenzol and from about ⅓ to about 4 gram-molecules of sodium hydroxide per gram-molecule of di-sodium diaminodioxyarsenobenzol.

8. A product comprising a substantially gas-free, aqueous solution of di-sodium diaminodioxyarsenobenzol and from about ⅓ to about 4 gram-molecules of sodium hydroxide per gram-molecule of di-sodium diaminodioxyarsenobenzol.

9. A product comprising a stable aqueous solution of di-sodium diaminodioxyarsenobenzol and about 1 gram-molecule of sodium hydroxide per gram-molecule of di-sodium diaminodioxyarsenobenzol.

10. A product comprising a substantially gas-free, aqueous solution of di-sodium diaminodioxyarsenobenzol and about 1 gram-molecule of sodium hydroxide per gram-molecule of di-sodium diaminodioxyarsenobenzol.

11. A product comprising a substantially oxygen-free solution of an arseno-benzol derivative.

12. A product comprising a substantially gas-free solution of an arseno-benzol derivative.

13. The process of preparing an aqueous solution of an arseno-benzol derivative in such form as to minimize decomposition and toxicity which comprises dissolving a predetermined amount of said derivative in substantially gas-free water and subjecting the resulting solution to a vacuum.

14. The process of preparing an aqueous solution of arsphenamine in such form as to minimize decomposition and toxicity which comprises dissolving a predetermined amount of arsphenamine in water under such conditions that the resulting solution will be substantially gas-free.

15. The process of preparing an aqueous solution of an arseno-benzol derivative in such form as to minimize decomposition and toxicity which comprises dissolving a predetermined amount of said derivative in substantially gas-free water under a vacuum to form a substantially gas-free solution, and adding to said solution from about four and a third to about 8 gram-molecules of alkali hydroxide per gram molecule of arseno-benzol derivative under such conditions that the resulting solution is substantially gas-free and of a degree of alkalinity sufficient to minimize decomposition and toxicity but not enough to cause excessive hemolysis.

16. The process of preparing an aqueous solution of arsphenamine in such form as to minimize decomposition and toxicity which comprises dissolving a predetermined amount of arsphenamine in substantially gas-free water under a vacuum to form a substantially gas-free solution, and adding from about four and a third to about 8 gram-molecules of alkali hydroxide per gram-molecule of arsphenamine under such conditions that the resulting solution is substantially gas-free and of a degree of alkalinity sufficient to minimize decomposition and toxicity but not enough to cause excessive hemolysis.

17. The process of preparing an aqueous solution of an arseno-benzol derivative in such form as to minimize decomposition, which comprises dissolving a predetermined amount of said derivative in substantially gas-free water under such conditions as to provide a substantially gas-free solution, adding to said solution about five gram-molecules of sodium hydroxide per gram-molecule of arseno-benzol derivative under such conditions that the resulting solution is substantially gas-free and of a degree of alkalinity sufficient to minimize decomposition but not enough to cause excessive hemolysis, and sealing the resulting substantially gas-free, alkaline solution out of contact with oxygen.

18. The process of preparing an aqueous solution of arsphenamine in such form as to minimize decomposition, which comprises dissolving a predetermined amount of arsphenamine in substantially gas-free water under such conditions as to provide a substantially gas-free solution, adding to said solution about five gram-molecules of sodium hydroxide per gram-molecule of arsphenamine under such conditions that the resulting solution is substantially gas-free and of a degree of alkalinity sufficient to minimize decomposition but not enough to cause excessive hemolysis, and sealing the resulting substantially gas-free, alkaline solution out of contact with oxygen.

19. The process of preparing an aqueous solution of an arseno-benzol derivative in such form as to minimize decomposition, which comprises dissolving a predetermined amount of said derivative in substantially gas-free water under such conditions as to provide a substantially gas-free solution, adding to said solution about five gram-molecules of sodium hydroxide per gram-molecule of arseno-benzol derivative under such conditions that the resulting solution is substantially gas-free, and of a degree of alkalinity sufficient to minimize decomposition but not enough to cause excessive hemolysis, and sealing the resulting substantially gas-free, alkaline solution under a vacuum.

20. The process of preparing an aqueous solution of arsphenamine in such form as to minimize decomposition, which comprises dissolving a predetermined amount of arsphenamine in substantially gas-free water under such conditions as to provide a substantially gas-free solution, adding to said solution about five gram-molecules of sodium hydroxide per gram-molecule of arsphenamine under such conditions that the resulting solution is substantially gas-free and of a degree of alkalinity sufficient to minimize decomposition but not enough to cause excessive hemolysis, and sealing the resulting substantially gas-free, alkaline solution under a vacuum.

21. The process of preparing an aqueous solution of an arseno-benzol derivative in such form as to minimize decomposition, which comprises dissolving a quantity of said derivative in substantially gas-free water, maintaining the resulting solution substantially gas-free by means of a vacuum, adding from about four and a third to about 8 gram-molecules of alkali hydroxide per gram molecule of arseno-benzol derivative to such solution, maintaining the resulting solution substantially gas-free by means of a vacuum and sealing the same under a vacuum.

22. The process of preparing an aqueous solution of arsphenamine in such form as to minimize decomposition, which comprises dissolving a quantity of arsphenamine in substantially gas-free water, maintaining the resulting solution substantially gas-free by means of a vacuum, adding to such solution from about four and a third to about 8 gram-molecules of alkali hydroxide per gram-molecule of arsphenamine, maintaining the resulting solution substantially gas-free by means of a vacuum and sealing the same under a vacuum.

23. A product comprising an aqueous, alkaline solution of an arseno-benzol derivative of a degree of alkalinity corresponding to more than 1/3 of a gram-molecule of alkali hydroxide per gram-molecule of arseno-benzol derivative.

24. A product comprising a substantially gas-free aqueous, alkaline solution of an arseno-benzol derivative of a degree of alkalinity corresponding to more than 1/3 of a gram-molecule of alkali hydroxide per gram-molecule of arseno-benzol derivative.

25. A product comprising a stable aqueous, alkaline solution of an arseno-benzol derivative of a degree of alkalinity corresponding to more than ⅓ of a gram-molecule of alkali hydroxide per gram-molecule of arseno-benzol derivative, but not of a degree of alkalinity great enough to cause excessive hemolysis.

26. A product comprising a substantially gas-free aqueous, alkaline solution of an arseno-benzol derivative of a degree of alkalinity corresponding to more than ⅓ of a gram-molecule of alkali hydroxide per gram-molecule of arseno-benzol derivative, but not of a degree of alkalinity great enough to cause excessive hemolysis.

27. A product comprising a stable aqueous, alkaline solution of di-sodium diaminodioxyarsenobenzol of a degree of alkalinity corresponding to more than ⅓ of a gram-molecule of alkali hydroxide per gram-molecule of di-sodium diaminodioxyarsenobenzol.

28. A product comprising a substantially gas-free, aqueous, alkaline solution of di-sodium diaminodioxyarsenobenzol of a degree of alkalinity corresponding to more than ⅓ of a gram-molecule of alkali hydroxide per gram-molecule of di-sodium diaminodioxyarsenobenzol.

29. A product comprising a stable aqueous, alkaline solution of di-sodium diaminodioxyarsenobenzol of a degree of alkalinity corresponding to more than ⅓ of a gram-molecule of alkali hydroxide per gram-molecule of di-sodium diaminodioxyarsenobenzol, but not of a degree of alkalinity great enough to cause excessive hemolysis.

30. A product comprising a substantially gas-free, aqueous, alkaline solution of di-sodium diaminodioxyarsenobenzol of a degree of alkalinity corresponding to more than ⅓ of a gram-molecule of alkali hydroxide per gram-molecule of di-sodium diaminodioxyarsenobenzol, but not of a degree of alkalinity great enough to cause excessive hemolysis.

31. A product comprising a substantially gas-free solution of di-sodium diaminodioxyarsenobenzol.

32. A product comprising an alkaline, substantially gas-free solution of an arseno-benzol derivative.

33. A product comprising an alkaline, substantially gas-free solution of di-sodium diaminodioxyarsenobenzol.

In testimony whereof, I have signed my name to this specification this 3rd day of October, 1919.

OTTO LOWY.